March 11, 1969 — K. L. GREGERSON — 3,431,979
SURFACE AND/OR GROUND EMBEDDED ARTICLE PICKERS
Filed June 28, 1966
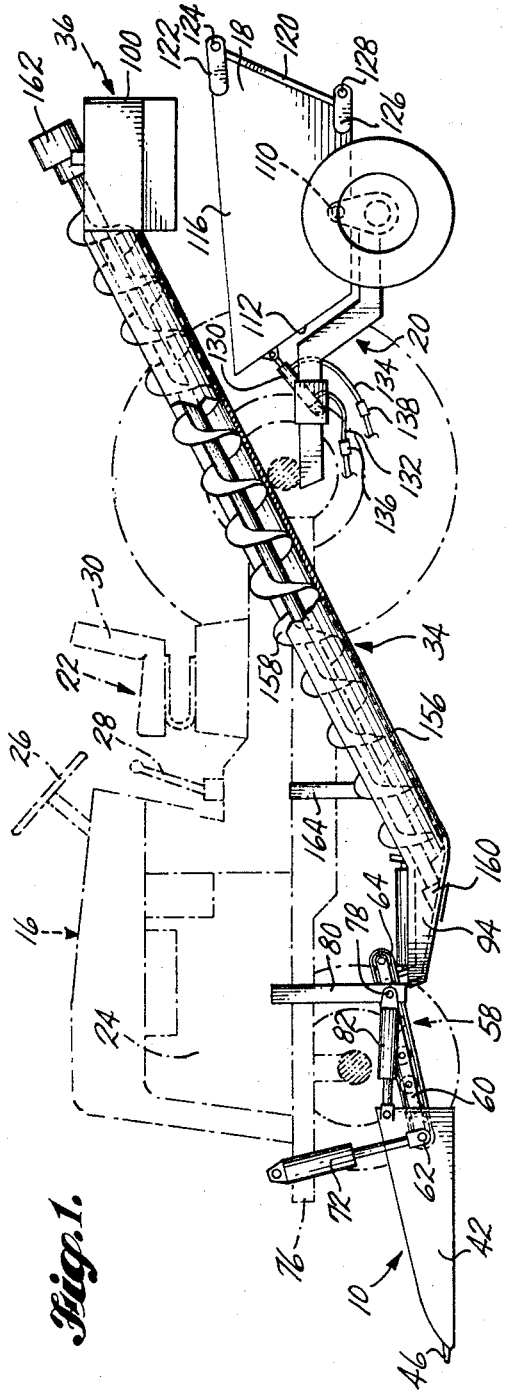
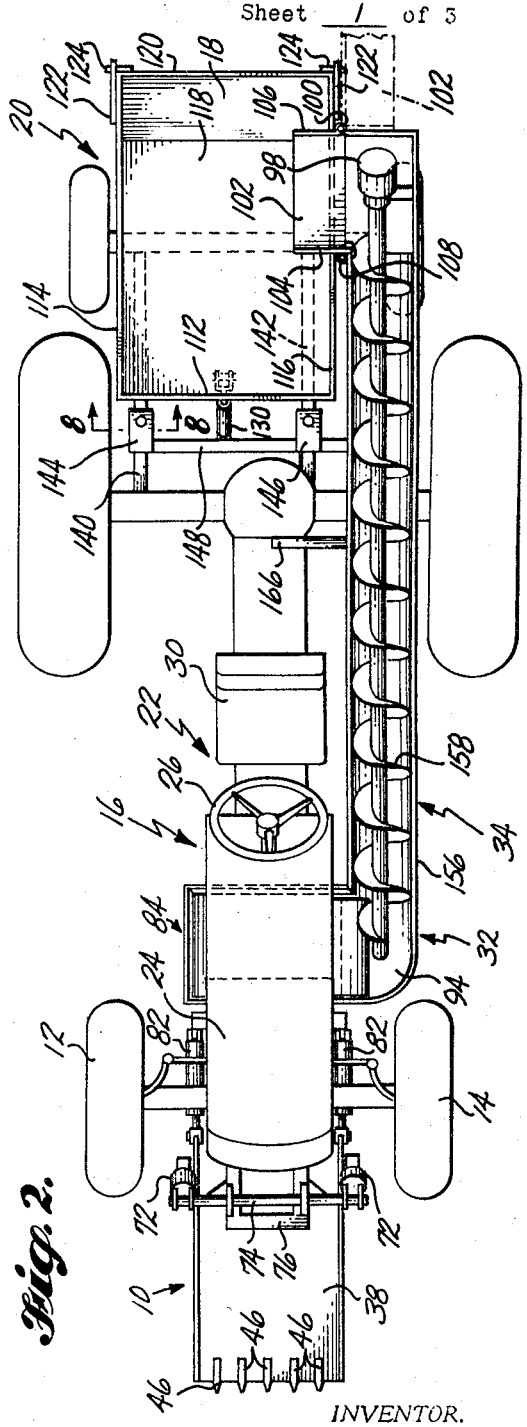
INVENTOR.
KENNITH L. GREGERSON
ATTORNEYS

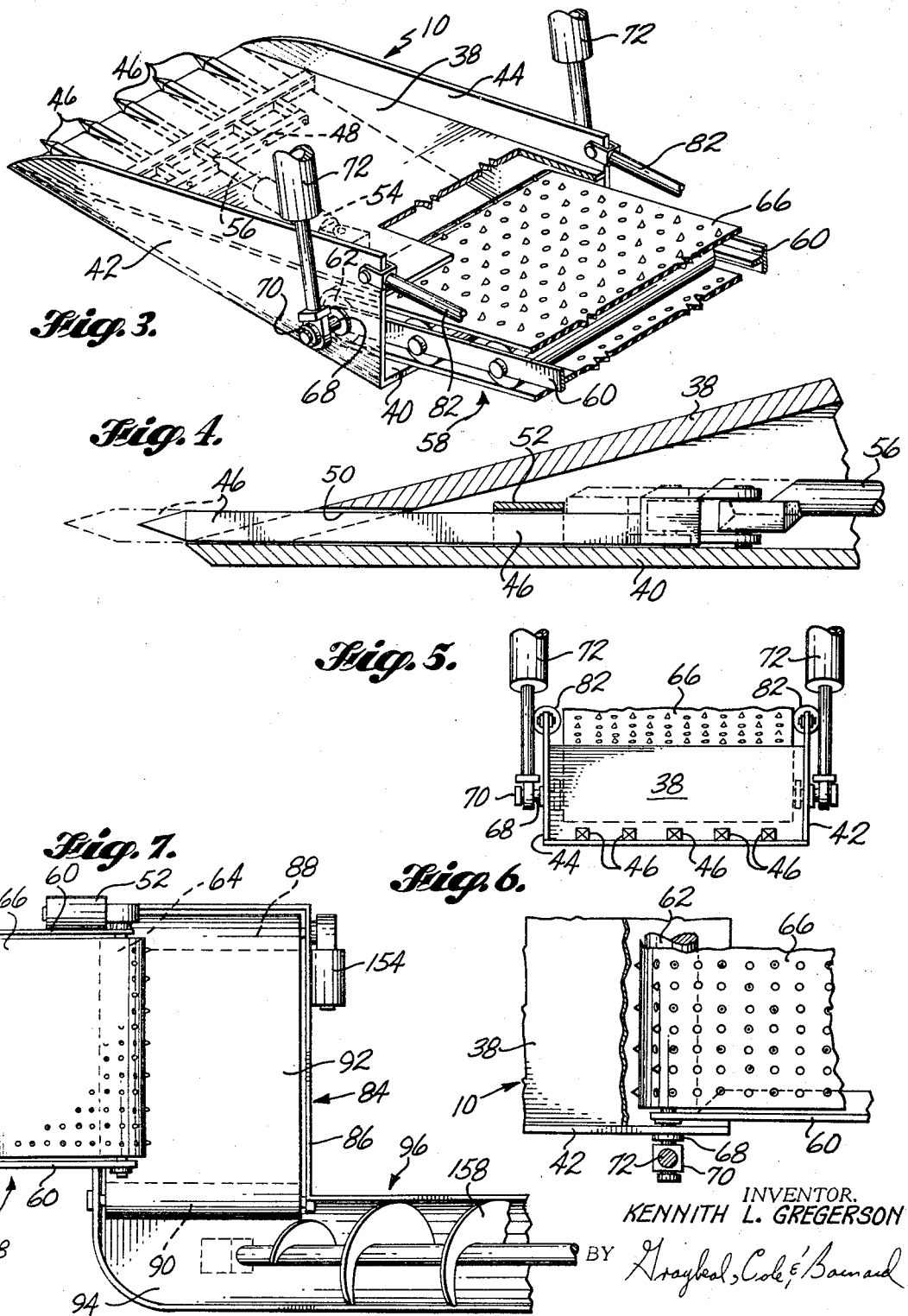

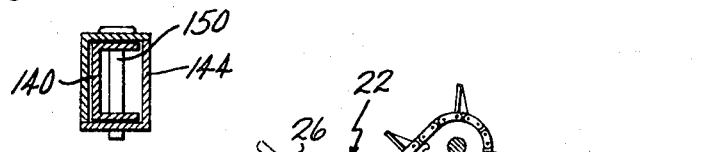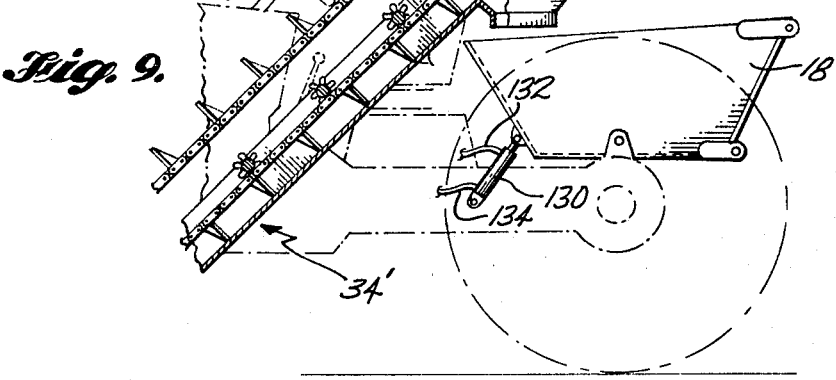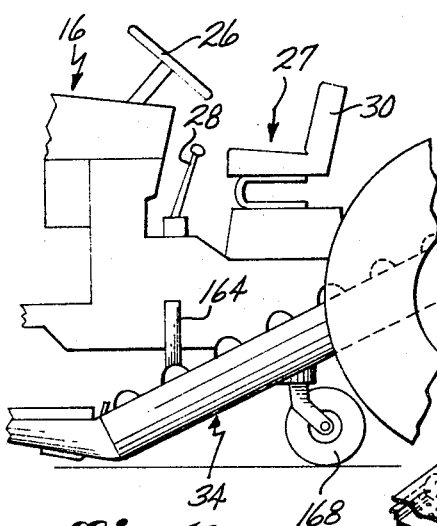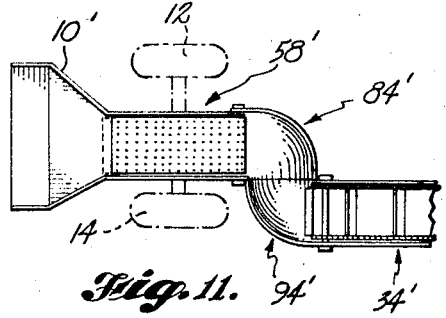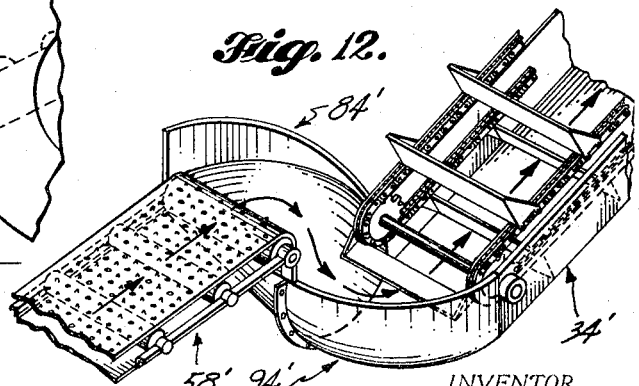

United States Patent Office 3,431,979
Patented Mar. 11, 1969

3,431,979
SURFACE AND/OR GROUND EMBEDDED ARTICLE PICKERS
Kennith L. Gregerson, Rte. 1, Box 148-B, Granite Falls, Wash. 98252
Filed June 28, 1966, Ser. No. 561,167
U.S. Cl. 171—63
Int. Cl. A01b 43/00
10 Claims

ABSTRACT OF THE DISCLOSURE

A scoop is mounted below a tractor in a path extending between the tractor's two front wheels. The scoop discharges onto a rearwardly extending first conveyor. The first conveyor discharges onto a second conveyor which extends laterally to a side location out from beneath the tractor. The second conveyor discharges onto a third elevating conveyor. The third conveyor raises the articles and deposits them into a bin carried by the tractor or by a trailer behind the tractor.

---

The present invention relates to a vehicular apparatus for picking up surface and/or ground embedded articles, and particularly for picking up rocks from agricultural fields.

Much potentially good agricultural land is not now being farmed because it is too rocky to work. The principal object of the present invention is to provide an improved vehicular apparatus which is capable of economically ridding such lands of surface rocks and rocks which are embedded in the ground or lie immediately below the surface, thereby rendering such lands suitable for farming.

Typical prior art rock picking machines are disclosed by the following U.S. Patents: Christenson 1,563,340; Weigel 2,763,975; McPherson 2,827,969; and Jacobs 2,980,189. An object of the present invention is to provide a self powered, self contained, and continuous advancement type rock picking vehicle which is simpler in construction, is more efficient, and in general constitutes an improvement over the rock picking apparatuses disclosed by these patents.

Surface and/or ground embedded article picking vehicles of the present invention are characterized essentially by a generally centrally located operator's station; a forwardly directed scoop depending below the vehicle and positioned generally in line with the operator's station; an article receiving box positioned rearwardly of, and generally in line with, the operator's station; and conveying and elevating means extending first rearwardly and laterally of the vehicle, from a station below the vehicle at the rear of the scoop to a station at side of the operator's station, and then rearwardly and upwardly along side the vehicle to a discharge station generally above the box. In preferred form, the conveying and elevating means comprises a first stage conveyor of the endless belt type, extending substantially straight rearwardly from the scoop to a station rearwardly of the front wheels and generally forwardly of the operator's station; a second stage conveyor of the endless belt type, directed across the vehicle and extending outwardly from a station below the rear end of the first stage conveyor to a station at one side of the vehicle, and a rearwardly directed elevating conveyor having a receiving pan positioned below the discharge end of the second stage conveyor, and inclining relatively steeply upwardly from said pan to said discharge station. The vehicle may include a trailer on which the article receiving box is mounted, and which comprises a frame, a wheel assembly supporting said frame, means for coupling said trailer to the rest of the vehicle, and means mounting the box on said frame for pivotal movement about a transverse axis and between upright and tilted positions. The box may include closed front bottom, and side walls, a rear discharge opening, a closure for said opening, hinged at its top to said box, releasable locking means for securing said closure to said box, in a discharge opening closing position, and lifter means interconnected between said frame and said box, for use in moving said box between its upright and tilted positions.

Another object of the present invention is to provide a surface and/or ground embedded article picker of the character described which includes an independent support wheel for the elevating conveyor.

A further object of the present invention is to provide a surface and/or ground embedded article picker of the character described in which the elevating conveyor terminates at a level above but to the side of (i.e. not directly over) said box, and includes a discharge chute means hinge connected thereto, and movable between a position wherein it extends inwardly from the elevating conveyor and over the box, and a position wherein it is out of the vertical path of said box, so that the box can be tilted for dumping.

A still further object of the present invention is to provide a surface and/or ground embedded article picker which comprises a forwardly directed scoop having a front-to-rear inclined ramp, a bottom, and a pair of spaced apart side walls, all together defining a hollow interior; article dislodging means at the front end of the scoop; means supporting and guiding such article dislodging means for fore-and-aft reciprocal movement; and actuator means connected to said article dislodging means in said hollow interior, for use in reciprocating said artcle dislodging means fore-and-aft.

Yet another object of the present invention is to provide a surface and/or ground embedded article picker that comprises a scoop having a front-to-rear inclined ramp, a bottom, and a pair of spaced apart side walls, all together defining a hollow interior; and an endless belt type conveyor extending rearwardly from said scoop, and comprising a frame having front and rear ends, belt supporting means at each of such ends, and an endless belt encircling said frame and said roller means, with the forward roller means and the forward portions of the frame and the belt being housed within the hollow interior of the scoop. In preferred form, the belt is constructed of a strong and durable, but relatively thin structural fabric, and such belt is provided with holding cleats in the form of a plurality of small spike means, each of which is secured to the belt and comprises an outwardly directed pointed portion.

These and other objects, features, and advantages of the present invention will be apparent from the foregoing description, appended claims and annexed drawing.

Referring to the drawings wherein like reference characters designate like parts throughout the several views:

FIG. 1 is a side elevational view of a surface and/or submerged article picker constructed according to the present invention, and involving a tractor-trailer vehicle, with the conventional tractor structure being depicted by broken or phantom lines, and the article picking and handling structure of the present invention by full or solid lines;

FIG. 2 is a top plan view of the article picking vehicle of FIG. 1, showing a preferred arrangement of the conveyor means which leads rearwardly from the scoop to the tractor mounted box;

FIG. 3 is a fragmentary perspective view taken from above and looking toward the rear and one side of the scoop, such view showing the manner in which the forward portion of the first stage conveyor is housed within the rear part of the hollow interior of the scoop, and further showing the foraminous nature of the first stage conveyor belt, and a typical form of embedded article dislodging means and the manner in which it is arranged with respect to the other components of the scoop;

FIG. 4 is a sectional view taken substantially along line 4—4 of FIG. 3, presenting a solid line showing of a rear or retracted position of the dislodging means, and a broken line showing of a forward or extended position of such means;

FIG. 5 is a front elevational view of the scoop, with the other parts of the article picking vehicle broken away;

FIG. 6 is a fragmentary top plan view of a forward side portion of the first stage conveyor, with the inclined ramp portion of the scoop being cut away, so as to expose the forward end of the conveyor belt which is normally covered thereby, and with the belt being shown to include a pattern of small holding cleats or studs;

FIG. 7 is a fragmentary plan view at the rear of the first stage conveyor, showing the discharge arrangement of the first stage conveyor onto a second stage conveyor, and the discharge arrangement of the second stage conveyor into a receiving pan of a third stage, elevating conveyor;

FIG. 8 is a cross-sectional view taken substantially along line 8—8 of FIG. 2, and showing a typical way of coupling the box trailer to the tractor;

FIG. 9 is a fragmentary side elevational view of the rear portion of a modified form of surface and/or ground embedded article picking vehicle, such form comprising a receiving box mounted on the tractor itself, rather than on a trailer;

FIG. 10 is a fragmentary side elevational view of an intermediate portion of still another modified form of article picking vehicle constructed according to this invention, such form comprising an independent support wheel for the elevating conveyor;

FIG. 11 is a fragmentary top plan view of the forward portion of a modified below-the-vehicle conveyor system; and FIG. 12 is a fragmentary perspective view, taken from above and looking toward one side, and rearwardly, of the rear portion of the below-the-vehicle conveyor system shown by FIG. 11.

Referring now to FIGS. 1 and 2, the scoop 10 is shown to be laterally centered between the two front wheels 12, 14 of a self-power vehicle or tractor 16. A picked article receiving box 18 is located at the rear of the tractor 16, and preferably is mounted on a trailer 20 so that it can be easily detached and removed from the tractor 16 when it is desired to use such tractor 16 when it is desired to use such tractor for some purpose other than picking up ground and/or surface embedded articles. However, the tractor may be adapted for article picking use only, in which case the box may be mounted directly on the tractor (FIG. 9). In either case the box 18 is located at the rear of the vehicle, behind and somewhat in line with an operator's station 22.

Herein the term "vehicle" is used to mean either the tractor 16 by itself or the tractor-trailer combination 16, 20.

The operator's station 22 is located rearwardly of the tractor's engine 24 and includes a steering wheel 26, control means (e.g. gearshift lever 28) for the engine 24, control means for the various other power operated equipment on the vehicle, and a seat 30.

According to the present invention, a below-the-vehicle conveying means extends rearwardly and laterally outwardly of the vehicle, commencing at the rear of the scoop 10 and terminating at a lower side location or station 32, situated rearwardly of the front wheel assembly 12, 14 and to one side of the engine 24 and the operator station 22, at a level still below the undersurface of the tractor vehicle and relatively close to the ground. A rearwardly directed elevating conveyor 34 rises rearwardly from station 32 and terminates at a discharge station 36, positioned generally above the box 18.

As best shown by FIGS. 3-5, scoop 10 comprises an inclined ramp 38 rising from about ground level at its front end relatively steeply upwardly to an above the ground, substantially higher level at its rear end. Scoop 10 has a wedge shaped hollow interior defined at the top by the ramp 38, at its bottom by a bottom plate 40, and at its sides by a pair of spaced apart, generally upright side walls 42, 44. A portion of each side wall 42, 44 extends between the side edges of ramp 38 and bottom plate 40 on its side of the scoop 10. Preferably, each side plate also includes an upper portion which projects above the ramp 38 and functions as a side barrier and guide for the picked up articles, functioning to guide them rearwardly, and up the ramp.

The scoop 10 may also include a forwardly positioned means for dislodging articles which are at least partly embedded in the ground. By way of typical example, such means may comprise a plurality of laterally spaced dislodging tines 46 interconnected at their rear ends, within a forward portion of the hollow interior of scoop 10, by a transverse tie bar 48. As shown by the FIGS. 4 and 5, for example, the front ends of the ramp 38 and the bottom plate 40 converge together as they extend forwardly. A set of tine receiving openings or passageways 50 are provided in the forward portion of the ramp 38, and each is sized to snugly receive one of the tines 46. Between the tine openings 50 the ramp 38 meets and is secured, as by welding the bottom plate 40. Guide means 52 may be provided inside the scoop 10 for and between the tines 48, such means 52 serving with the openings 50 to guide the tines 46 in their movement along a substantially straight fore-and-aft path.

A fast acting fluid or electric actuator 54 is housed within the scoop interior, and is connected to a central portion of the tie bar 48 by a connector rod 56. Rod 56 is connected at its rear end to a piston (fluid form) or armature (electric form) located inside the housing of actuator 54. In operation, actuator 54 is energized to move the tines 46. As each tine 46 is positively moved or driven forwardly, it exerts a dislodging force on any ground embedded article that is in its path. The stroke of tines 46 is only a few inches, but is sufficient to provide all the force that is necessary to dislodge an article of the size the picker of the present invention is designed to handle, which is an article about one to ten inches across or in diameter.

In preferred form, the conveying means situated below the vehicle comprises a first stage conveyor 58 of the endless belt type. Referring to FIGS. 1 and 3 in particular, it is shown to comprise a rigid frame 60, a belt supporting roller 62 at the front end of the frame 60, a belt supporting roller 64 at the rear end of the frame 60, and an endless belt 66 of a suitable strong and durable, but flexible, structural fabric.

As best shown by FIG. 3, the front roller 62 and the front portions of the frame 60 and the belt 66 are housed within the rear portion of the hollow interior of scoop 10, rearwardly as actuator 54. Preferably, roller 62 includes a short shaft at each of its ends, and such shafts first extend through and then project outwardly beyond, the scoop side walls 42, 44. Bearing means 68 are provided where the shafts pass through the end portions of the frame 60 and the scoop side walls 42, 44. Each end shaft then projects through and is supported by another bearing 70 which is positioned outwardly of bearing 66, and constitutes a lower end portion of a hydraulic lifter 72. As shown in FIGS. 1 and 2, the lifters 72 may be pivotally connected at their upper ends to the opposite ends of a transverse mounting bar 74 which in turn is secured to a frame portion 76 of the tractor 16.

Frame 60 of first stage conveyor 58 may be pivotally connected at each side to one of a pair of vertically depending support members 78, so that the first stage conveyor 58 is free to swing vertically about point 78 when the scoop 10 is being lifted or lowered by the lifters 72. The scoop frame may be stabilized, and its attitude controlled by a pair of actuators 82, each of which is interconnected between an upper side portion of the scoop 10 and the pivot point 78 on its side of the tractor 16.

In preferred form, the first stage conveyor 58 is arranged to feed onto a second stage conveyor 84 that is directed transversely of the vehicle. Conveyor 84 is shown (FIGS. 1, 2 and 7) to include a supporting frame 86, a pair of parallel belt supporting rollers 88, 90, and an endless belt 92 encircling the rollers 88, 90.

The second stage conveyor 84 feeds into the receiving pan 94 (at station 32) of the third stage, elevating conveyor 34. The receiving pan 94 is positioned relatively close to the ground, is offset to one side of the engine 24, and is rearwardly adjacent the front wheel assembly 12, 14.

The elevating conveyor 34 rises relatively steeply as it extends rearwardly from receiving pan 94. Preferably, it extends alongside the vehicle and terminates at a level above, but not directly over, the box 18. In FIG. 2 it is shown to include a discharge chute 98 that is hinge connected to conveyor 34 at 100, for horizontal movement about a vertical axis. Discharge chute 98 includes a bottom 102, spaced apart side walls 104, 106, and a flange 108 extending generally perpendicularly from wall 104. Discharge chute 98 is pivotally moveable between an in-use position (depicted by solid lines), wherein flange 108 contacts the inside wall of conveyor 96 and the chute 98 extends over a portion of the box 18, and an out-of-the-way position (depicted by broken lines in FIG. 2), wherein it is out of the vertical path of movement of the box 18. Discharge chute 98 may be secured or held in its in-use position by a pin or bolt inserted through both flange 108 and the portion of the inside wall of conveyor 34 which such flange contacts.

Box 18 is mounted at 110 to the frame of trailer 20 for pivotal movement about a transverse axis and between upright and tilted positions. It may include a front wall 112, side walls 114, 116, a bottom 118, and a rear tail gate 120. A mounting plate 122 is welded or otherwise secured to the upper rear portion of each side wall 114, 116. The plates 122 include apertured rear end portions, the apertures of which receive trunnion-like hinge pins 124 which are secured to, and extend outwardly from the closure gate 120. A lower set of side plates 126 may be secured to the side walls 114, 116, and a transverse bar 128 may be inserted through aligned apertures in the rear portion thereof, for retaining gate 120 in a closed position. Bar 128 may have a head or bent over portion at once of its ends, and be threaded at its opposite end to receive a nut (not shown).

A hydraulic lifter 130 or the like, shown to be interconnected between the frame of trailer 20 and a forward portion of box 18, is provided for moving the box 18 between its upright (FIG. 1) and tilted positions.

The hydraulic lifter 130 is operationally incorporated into the hydraulic circuit (not shown) provided aboard the tractor 16 (for lifters 72 and actuators 54 and 82, for example) by means of flexible conduits or hoses 132, 134. The hoses 132, 134 include couplings 136, 138 intermediate their respective lengths. When it is desired to disconnect the trailer 18 from the tractor 16, the couplings 136, 138 are disconnected, and the portions of the lines 132, 134 forwardly of the couplings 136, 138 stay with the tractor 16, and the portions of such lines rearwardly of such couplings 136, 138 stay with the trailer 18.

The trailer 18 may be provided with a pair of forwardly projecting tongues 140, 142 adapted to snugly fit into socket means 144, 146, respectively, which are connected to a portion of the tractor 16 by a framework 148. By way of typical example, the boxes 144, 146 may be rectangular in cross section and made from complementary angle iron members welded together to form a box (FIG. 8), and the tongues 140, 142 may each be a piece of channel iron. The trailer 18 is connected to the tractor 16 by simply sliding the tongues 140, 142, forwardly into their respective sockets 140, 146, and then dropping a locking pin 150 through vertically aligned openings in such sockets and tongues.

In operation, the operator sitting at seat 30 and behind wheel 26 operates the lifters 72 and the actuators 82 to place the scoop 10 at a proper working attitude. He then drives the vehicle forwardly so that the upper portion of the ground surface is skimmed off by the scoop 10 and moved rearwardly up the inclined ramp 38 and then onto the first stage conveyor belt 66. The picked up articles are then deposited by the first stage conveyor belt 66 onto the laterally directed second stage belt 92, and by it are delivered to the receiving pan 94 of the elevating conveyor 34. Elevating conveyor 34 then lifts the articles up to the discharge stage 36 whereat they are deposited by chute 98 into the box 18. As is apparent, this operation does not require repetitive starting and stopping of the vehicle, but rather is a continuous operation and permits continuous advancement of the vehicle along the field.

When the box 18 is full the vehicle is merely driven to the side of the field and the contents of box 18 dumped. When it is desired to use the tractor for some other purpose, the trailer 20 (and perhaps the other picking apparatus also) is removed and stored.

FIGS. 11 and 12 disclose a modified form of scoop and conveyor system. The first stage conveyor 58 is narrower than in the form disclosed by FIGS. 1 and 2 and is asymmetrically related to the tractor; it is located closer to the left front wheel 14 than to the right front wheel 12. The scoop 10 is unbalanced in the opposite direction, and it includes a front entrance that is preferably symmetrically related to the tractor.

In place of a second stage conveyor of the endless belt type, the first stage conveyor 58' feeds into a side-sloping trough 84' which is turn feeds into the receiving pan 94' of the elevating conveyor 34.

Various other details and modified forms of the components making up the surface and/or ground embedded article picker of the present invention will now be described.

Scoop assembly

In the arrangement shown by FIGS. 1 and 2, the scoop 10 may be made to be substantially wider at its front end than at its rear end, as is shown in FIGURE 11. In such form the upstanding guide portions of the side walls 42, 46 converge together as they extend from front to rear.

Referring to FIG. 7, the first stage conveyor 58 may be powered by an electric or hydraulic motor 152 which is operatively connected to an end of the rear belt supporting roller 64. In similar fashion the second stage conveyor 34 may be powered by an electric or hydraulic motor 154 which is operatively connected to its belt supporting roller 88.

The first stage conveyor belt 66 is shown to be perforated. Some of the dirt that is picked up along with the rocks or other articles will fall through the openings and back to the ground below the vehicle. The second stage conveyor belt 92 may also be perforated.

Elevating conveyor

The elevating conveyor 34 may be of a worm screw type, comprising a trough 156 which is generally U-shaped in cross section and a worm screw 158 having a central shaft portion which is supported at its forward end by a bearing 160 incorporated in the receiving pan 94, and supported and rotated at its rearward end by an electric or hydraulic motor 162.

In the embodiment shown by FIGS. 1 and 2, the elevating conveyor 34 is rigidly secured to the tractor 16 by mounting brackets 164, 166 or the like. It might be desirable to relieve the tractor 16 of some of the weight of conveyor 34, and this may be done by providing conveyor 34 with an independent support 168. Such a wheel 168 may be located near the front end of conveyor 34. It may be located directly below a portion of the conveyor 34, as shown by FIG. 10, or instead positioned to one side of the conveyor 34.

What is claimed is:

1. A surface and/or ground embedded article picker comprising a forwardly directed scoop having a front-to-rear inclined ramp and a pair of side walls, together at least in part defining a hollow interior; and an endless belt type conveyor extending rearwardly from said ramp and having a forward portion housed in the rearward portion of said hollow interior, and including a belt of a tough and durable but relatively thin structural fabric encircling said frame and said roller means, with the forward roller means and the forward portions of the frame and belt being housed within the rearward portion of the hollow interior of the scoop, and a plurality of a spike means secured to said belt and each comprising an outwardly projecting point portion.

2. A vehicle for picking up surface and/or ground embedded articles, such as rocks, said vehicle having front and rear pairs of wheels, an engine at least apart of which is positioned rearwardly of said front wheels, and all of which is positioned forwardly of the rear wheels, an operator's station situated rearwardly of said engine, said operator's station including engine controls and a seat, and article picking and handling apparatus comprising: a scoop depending below said vehicle and positioned to establish a pick up path extending rearwardly between the front wheels, said scoop including an inclined ramp rising from about ground level at its front end to an above the ground, substantially higher level at its rear end; an article storing box positioned rearwardly of said operator's station; and conveying and elevating means extending rearwardly and laterally outwardly, from a station below the vehicle adjacent the rear end of said ramp to a station near the ground and to one side of said engine, and thence rearwardly and upwardly alongside of the vehicle to a discharge station above said box, wherein said scoop also includes side wall means, and a hollow interior defined at least in part by said ramp and said side wall means; and wherein said conveyor comprises a first stage conveyor comprising relatively rigid support frame having front and rear ends, a belt supporting roller at each end of said frame, means on said frame journaling each of said rollers for rotation about an axis directed generally transversely of said vehicle, and an endless conveyor belt encircling said frame and said end rollers, with the front roller and the forward end portions of said frame and said belt being housed within said hollow interior.

3. A vehicle according to claim 2, wherein said front roller includes trunnion means at its ends extending through, and projecting outwardly beyond the side walls of said scoop; and said vehicle further includes a hydraulic lifter extending from a side location thereon, generally above the scoop, downwardly to each trunnion means.

4. A vehicle according to claim 2, wherein said conveyor and elevating means also comprises a second stage conveyor of the endless belt type, extending across the vehicle from a station below the rear end portion of the first stage conveyor and outwardly to a station to one side of the operator's station, and a rearwardly directed third stage, elevating conveyor means having a receiving pan positioned below the discharge end of the second stage conveyor, and inclining rearwardly relatively steeply upwardly from said pan to said discharge station.

5. The combination of claim 2, further comprising a trailer having a frame, a wheel assembly supporting said frame, means for coupling said trailer to said vehicle, and means mounting said box on said frame for pivotal movement about a transverse axis and between tilted and upright positions, said box including closed front, bottom and side walls, a rear discharge opening, a rear closure for said opening, hinged at its top to said box, releasable locking means for securing said closure to said box in a discharge opening closing position, and lifter means interconnected between said frame and said box, for moving said box between its upright and tilted positions.

6. The combination of claim 2, further including an independent support wheel for the conveying and elevating means which rises rearwardly from the station near the ground and to one side of the operator's station and extends upwardly to the discharge station above the box.

7. A vehicle for picking up surface and/or ground embedded articles, such as rocks, said vehicle having front and rear pairs of wheels, an engine at least a part of which is positioned rearwardly of said front wheels, and all of which is positioned forwardly of the rear wheels, an operator's station situated rearwardly of said engine, said operator's station including engine controls and a seat, and article picking and handling apparatus comprising: a scoop depending below said vehicle and positioned to establish a pick up path extending rearwardly between the front wheels, said scoop including an inclined ramp rising from about ground level at its front end to an above the ground, substantially higher level at its rear end; an article storing box positioned rearwardly of said operator's station; conveying and elevating means extending rearwardly and laterally outwardly, from a station below the vehicle adjacent the rear end of said ramp to a station near the ground and to one side of said engine, and thence rearwardly and upwardly alongside of the vehicle to a discharge station above said box; and means mounting said box for pivotal movement about a transverse axis and between upright and tilted positions, and wherein said elevating conveyor means terminates at a level above but to one side of said box, and includes discharge chute means hinge connected thereto and pivotally movable between a position wherein it extends inwardly from the elevating conveyor means and over the box, and a position wherein it is vertically out of the path of said box, so that the box may be tilted for dumping.

8. A surface and/or ground embedded article picker comprising a forwardly directed scoop having a front-to-rear inclined ramp, a bottom, and a pair of spaced apart side walls, all together defining a hollow interior; article dislodging means at the front end of the scoop; means supporting and guiding said article dislodging means for fore-and-aft reciprocal movement; actuator means in said hollow interior and connected to said article dislodging means, for reciprocating said article dislodging means fore-and-aft; and an endless belt type conveyor extending rearwardly from said scoop and comprising a rigid frame having front and rear ends, belt supporting roller means at each of such ends, and an endless belt encircling said frame and said roller means, with the forward roller means and the forward portions of the frame and belt being housed within the hollow interior of the scoop, rearwardly of said actuator means.

9. A surface and/or ground embedded article picker according to claim 8, wherein said actuator means is a hydraulic piston-cylinder motor.

10. A surface and/or ground embedded article picker according to claim 8, wherein said scoop includes a plurality of laterally spaced, forwardly directed openings, and wherein the article dislodging means comprises a plurality of tines, one extending forwardly of the scoop through each of said openings.

(References on following page)

References Cited

UNITED STATES PATENTS

| | | | |
|---|---|---|---|
| 876,834 | 1/1908 | Pettit | 171—113 |
| 1,855,998 | 4/1932 | Shannon. | |
| 2,453,714 | 11/1948 | Lapointe | 171—130 XR |
| 2,470,211 | 5/1949 | Bozeman et al. | 171—131 XR |
| 2,696,287 | 12/1954 | Foust. | |
| 2,732,672 | 1/1956 | Fleischman | 171—63 |
| 2,976,936 | 3/1961 | Fry | 171—126 |

FOREIGN PATENTS

| | | |
|---|---|---|
| 710,650 | 6/1954 | Great Britain. |

ANTONIO F. GUIDA, *Primary Examiner.*